United States Patent
Mullins

(10) Patent No.: US 7,287,774 B2
(45) Date of Patent: Oct. 30, 2007

(54) STABILIZING DEVICE FOR A MOTORCYCLE

(76) Inventor: Raymond Mullins, 2685 N. Route 45/52, Clifton, IL (US) 60927

( * ) Notice: Subject to any disclaimer, the term of this patent is extended or adjusted under 35 U.S.C. 154(b) by 0 days.

(21) Appl. No.: 10/405,161

(22) Filed: Apr. 2, 2003

(65) Prior Publication Data

US 2004/0195800 A1   Oct. 7, 2004

(51) Int. Cl.
   *B62H 1/12*   (2006.01)
(52) U.S. Cl. .................. 280/293; 280/767; 180/219
(58) Field of Classification Search ............... 180/219; 280/293, 296, 295, 301–304, 124.13, 124.169, 280/755, 763.1, 767; 267/154, 273, 276, 267/279
   See application file for complete search history.

(56) References Cited

U.S. PATENT DOCUMENTS

| | | | | |
|---|---|---|---|---|
| 2,636,567 A | * | 4/1953 | Landrum | 180/227 |
| 2,915,306 A | * | 12/1959 | Hickman | 267/280 |
| 3,602,528 A | * | 8/1971 | Kelly | 280/293 |
| 3,693,987 A | * | 9/1972 | Bobard et al. | 280/755 |
| 3,980,150 A | * | 9/1976 | Gigli | 180/209 |
| 4,133,402 A | | 1/1979 | Soo Hoo | 180/30 |
| 4,181,190 A | | 1/1980 | Yang | 180/219 |
| 4,203,500 A | | 5/1980 | Kamiya | 180/219 |
| 4,638,880 A | * | 1/1987 | Togashi | 180/219 |
| 4,826,194 A | | 5/1989 | Sakita | 280/302 |
| 4,966,386 A | * | 10/1990 | Werdich | 280/124.13 |
| 5,029,894 A | * | 7/1991 | Willman | 280/755 |
| 5,419,575 A | * | 5/1995 | Shepherd | 280/302 |
| 6,213,237 B1 | * | 4/2001 | Willman | 180/209 |
| 6,296,266 B1 | * | 10/2001 | Martin | 280/293 |
| 6,447,073 B1 | * | 9/2002 | Goettker | 301/127 |

FOREIGN PATENT DOCUMENTS

FR   2 613 988   10/1988

* cited by examiner

*Primary Examiner*—Kevin Hurley
(74) *Attorney, Agent, or Firm*—Bell, Boyd & Lloyd LLP

(57) ABSTRACT

A stabilizing device with an tubular housing is disclosed. The tubular housing may be manufactured to provide the torsion assembly an ability to rotate from a first position to a second position without substantially changing the angle of the stabilizing wheels and thus allows a motorcycle to turn through turns at low or high speeds without tipping over. The tubular housing further contains an elastic receiver the absorbs the rotational force of the torsion assembly and upon removal of the gravitational force of the motorcycle, the elastic receiver provides a retracting force on the torsion assembly to return the orientation of the torsion assembly to the original first position.

12 Claims, 7 Drawing Sheets

— 1 —

STABILIZING DEVICE FOR A MOTORCYCLE

TECHNICAL FIELD

This disclosure generally relates to stabilizing devices, and more particularly to stabilizing devices for motorcycles.

BACKGROUND OF THE RELATED ART

Motorcycle riding is an enjoyable but dangerous activity. In particular, large motorcycles can be difficult to maneuver, especially at low speeds. In 1997 alone, 2,106 motorcyclists died and approximately 54,000 were injured in highway crashes in the United States. Proper training measures could reduce the number of injuries and fatalities of motorcyclists. In addition, devices to stabilize motorcycles could also reduce motorcycle accidents.

The prior art teaches a number of different types of stabilizing devices for motorcycles. For example, the art teaches motorcycle auxiliary support systems that include right and left arms at opposite sides of the vehicle in which the arms are attached to a connecting shaft extending transversely under the motorcycle. In certain embodiments, the arms extend downwardly and rearwardly from the connecting shaft and provide left and right ground engaging auxiliary wheels at the lower ends. Some designs include a releasable lock engagable with the auxiliary wheel assembly that locks the same wheel assembly against upward pivotal rotation about the connecting shaft. In the locked condition, the motorcycle is stabilized to prevent tipping onto its side, but only at low speeds and when the vehicle is stopped.

Other designs are more elaborate. For example, auxiliary support systems for a motorcycle also include use of oil pressure dampers in the left and right arms between the motorcycle body and the arm member to allow the arm members to swing in an upward and downward movement. This movement allows that two-wheel vehicle to lean and prevent turnover.

It would be helpful to have a stabilizing device that does not require complex systems such as oil pressure dampers or auxiliary support systems that can only be used at low speeds. In particular, it would be helpful for those to have a stabilizing device that can be used at all times at low and high speeds, and provides a stability to the motorcycle.

Figure 1:
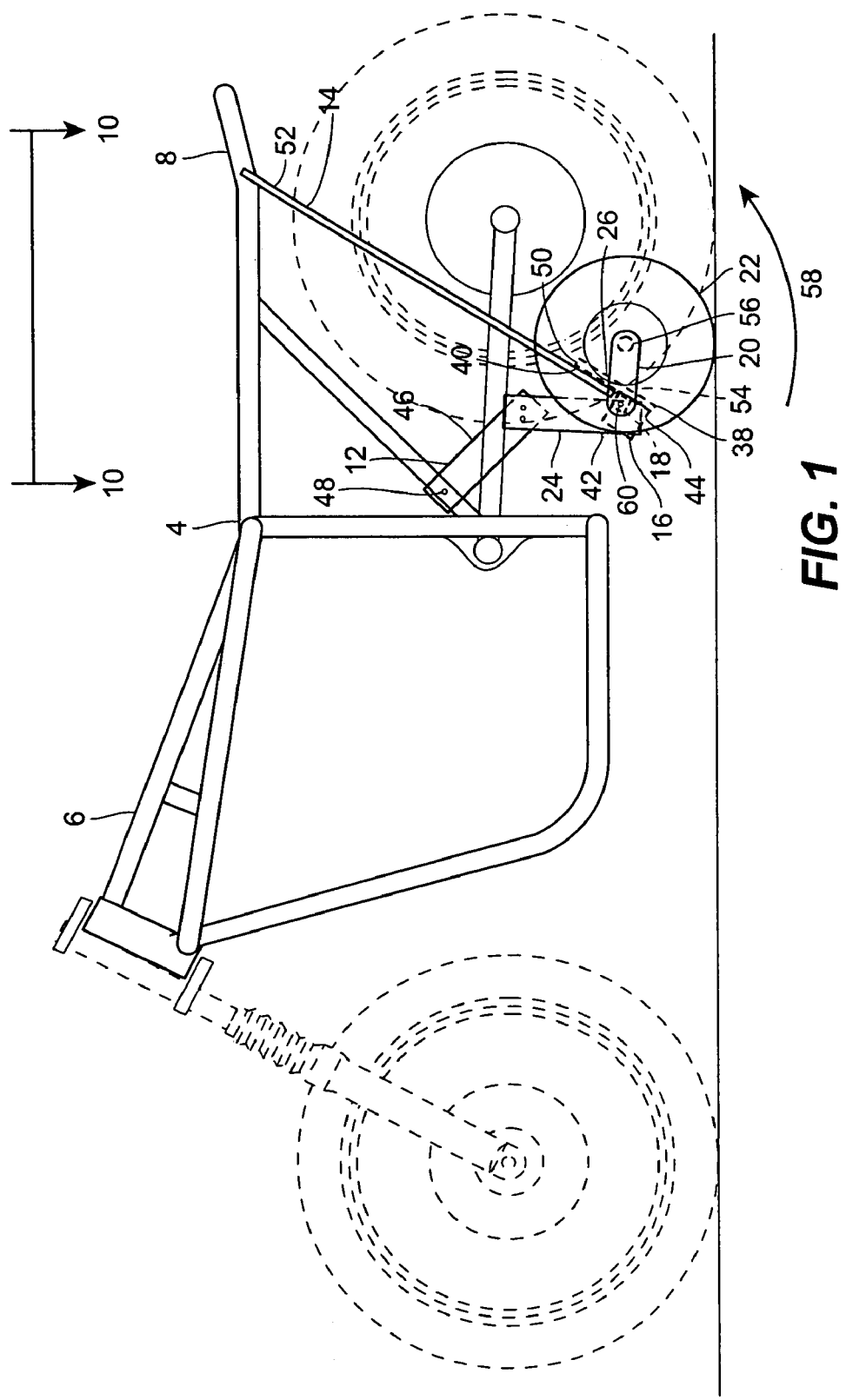
FIG. 1 is a side view of the stabilizing device constructed in accordance with the teachings of the disclosure.

While the disclosure is susceptible to various modifications and alternative constructions, certain illustrative examples thereof have been shown in the drawings and will be described below in detail. It should be understood, however, that there is no intention to limit the disclosure to the specific forms disclosed, but on the contrary, the intention is to cover all modifications, alternative constructions, and the equivalents falling within the spirit and scope of the invention as defined by the appended claims.

DETAILED DESCRIPTION

Figure 2:
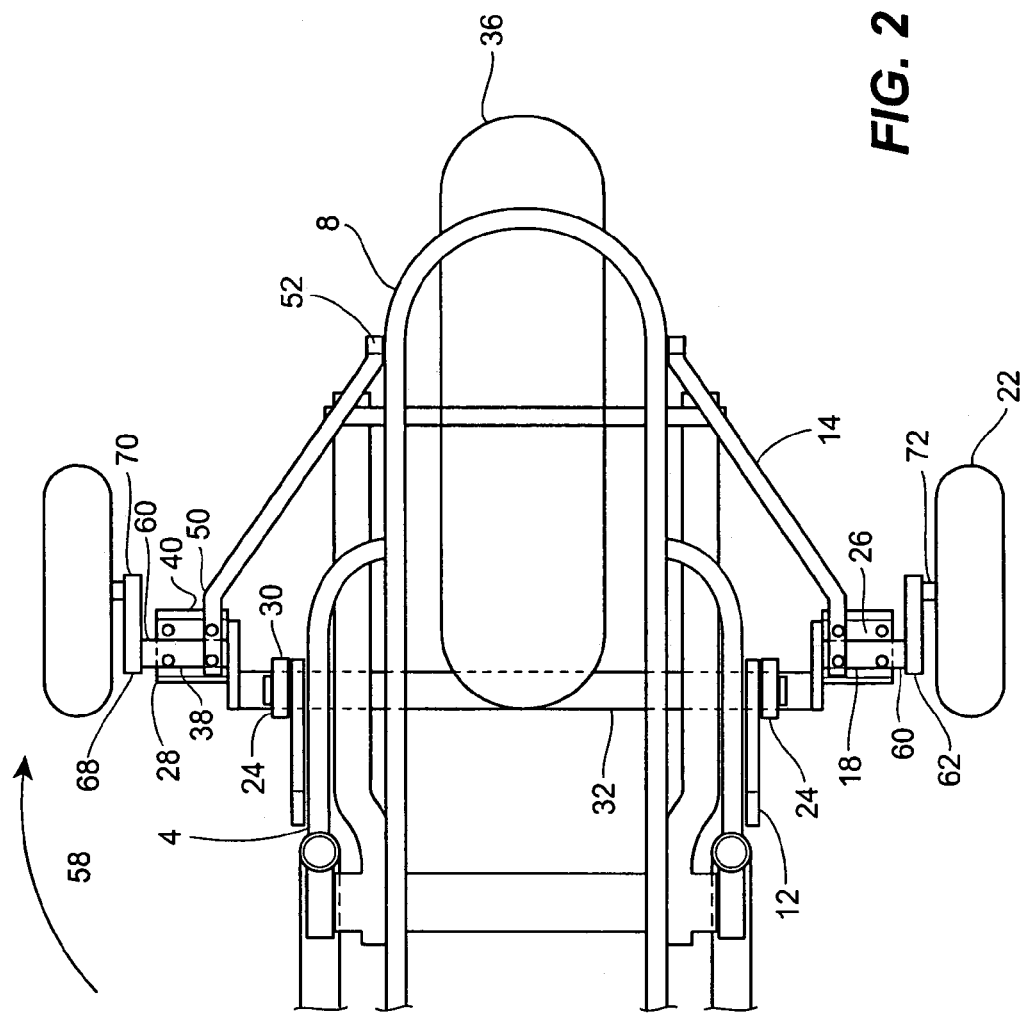
FIG. 2 is a top view of the stabilizing device of FIG. 1.

Referring now to the drawings, FIGS. 1 and 2 illustrate a side and top view of a motorcycle 2 under a standard construction including a motorcycle frame 4. The motorcycle frame 4 has a front portion 6 and a rear portion 8. The motorcycle frame 4 further includes a stabilizing device 10 that is attached and located in the proximity between the front portion 6 and the rear portion 8 of the motorcycle frame 4. One side of the stabilizing device 10 includes a forward mounting bracket 12, a rear mounting bracket 14, a stabilizing axle 16, a tubular housing 18, a torsion assembly 20, and a stabilizing wheel 22. As can be seen in FIG. 2, all components encompassing the stabilizing device 10 are symmetrically aligned so that counterpart components exist on either end of the motorcycle frame 4. Counterpart members include, but are not limited to, the forward mounting bracket 12, the rear mounting bracket 14, the tubular housing 18, the torsion assembly 20, and the stabilizing wheel 22. The stabilizing device 10 provides assistance in keeping the motorcycle 2 upright and allows the motorcycle 2 to lean through turns at low and high speeds.

The stabilizing axle 16 includes a forward axle mounting plate 24, a rear axle mounting plate 26, and an tubular housing 18. The stabilizing axle 16 further includes a first end 28, a second end 30, and a middle portion 32. In FIG. 2, the front view depicts both ends 28, 30 and the middle portion 32 of the stabilizing axle 16. The stabilizing axle 16 passes through the motorcycle frame 4 between the front portion 6 and the rear portion 8 in a perpendicular orientation while running parallel to the ground. The stabilizing axle 16 provides the necessary support for the entire stabilizing device 10 and properly orientates the stabilizing wheels 22 to run parallel to the front 34 and rear 36 tires (FIG. 5) of the motorcycle 2.

Figure 3:
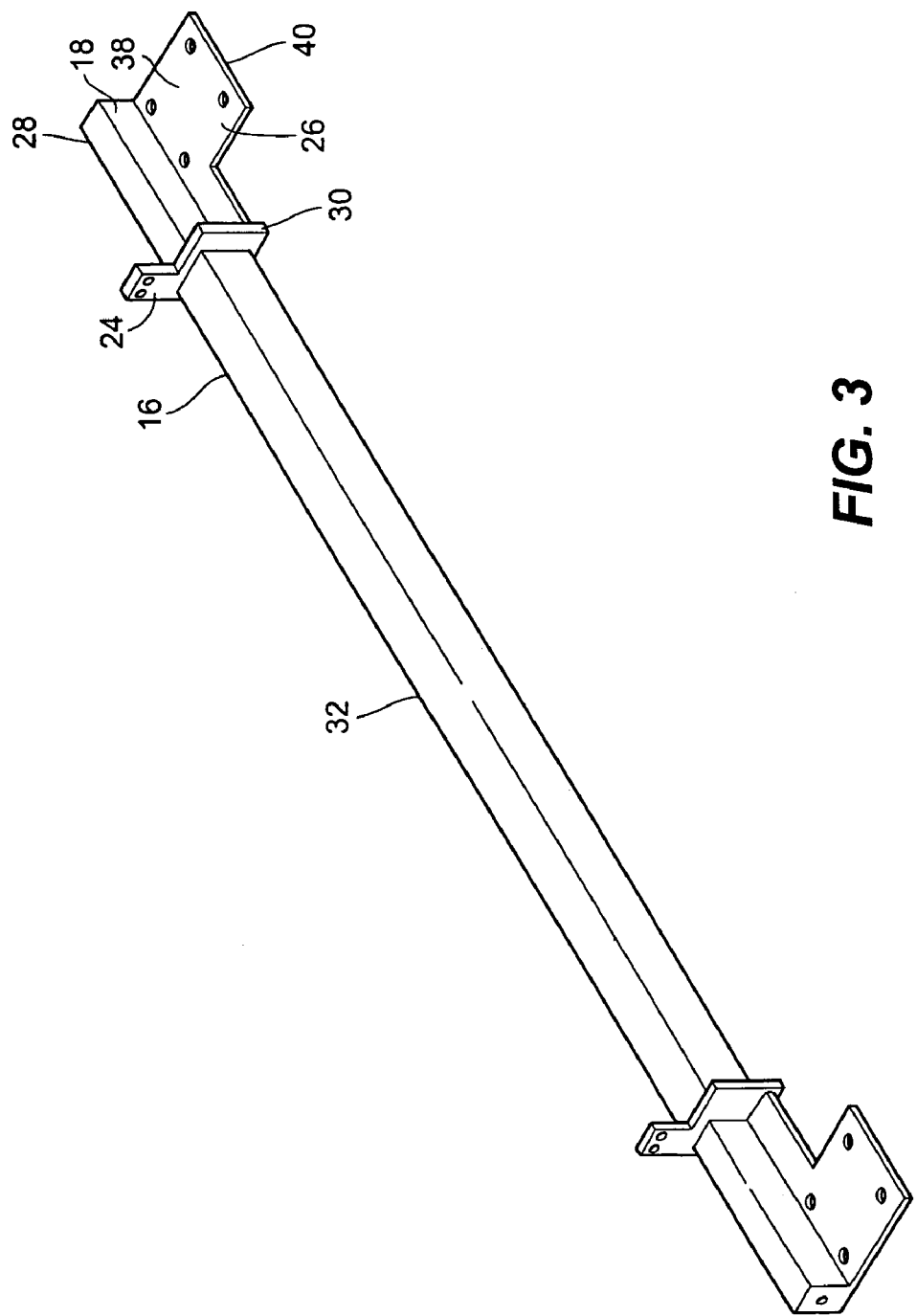
FIG. 3 is a elevational view of the stabilizing axle constructed in accordance with the teachings of the disclosure.

Each member of the stabilizing axle 16 is symmetrically aligned so each counterpart member is on either end of the motorcycle frame 4 as can be seen in FIGS. 2 and 3. Counterpart members include, but are not limited to, the forward axle mounting plate 24, the rear axle mounting plate 26, and the tubular housing 18.

On the first 28 and second 30 end of the stabilizing axle 34 is the tubular housing 18. The tubular housing 18 may be solid throughout most of the structure with a hollow portion at the end of the housing distal to the motorcycle frame 4 or the tubular housing 18 can be hollow throughout the entire tubular housing 18 structure (see FIG. 3). The tubular housing 18 may be in the shape of an elongated cyclinder, rectangle, or triangle or any other shape know to those of skill in the art for tubular housing members. The ends of the tubular housing 18 most distal to the motorcycle frame 4 attach to the torsion assembly 20 and will be discussed in more detail below in regard to FIGS. 2-4.

The middle portion 32 of the stabilizing axle 16 (see FIGS. 2-4) is welded to the first 28 and second 30 ends of the stabilizing axle 16, and thus is welded to the tubular housing members 18 as well. The middle portion 32 of the stabilizing axle 16 may be composed of solid material or hollow and the shaft may be in the shape of an elongated cylinder, rectangle, triangle, or any other shape know to those of skill in the art for axles. In another embodiment, the stabilizing axle's 16 first end 28 and second end 30 are one continuous piece. In yet another embodiment, the first end 28 and second end 30 may fit inside the tubular housing 18 and may be held in place with pins or set screws, for example. The middle portion 32 of the stabilizing axle 16 passes through the motorcycle frame 4 between the front portion 6 and the rear portion 8 in a perpendicular orientation while running parallel to the ground. The front wheel 34 (not pictured) is proximal to the middle portion 32 of the stabilizing axle 16 and the rear tire 36 is distal to the middle portion 32 of the stabilizing axle 16.

Viewing FIGS. 1-4, an attaching rear axle mounting plate 26 is welded to a side of the tubular housing 18 proximal to the rear portion 8 of the motorcycle frame 4 and runs parallel and above the rear mounting bracket 14. Referring to FIG. 3, the rear axle mounting plate 26 includes a first end 38 and a second end 40. The first end 38 may be welded or otherwise attached to the side of the tubular housing 18 or first end 28 of the stabilizing axle 16. The second end 40 of the rear axle mounting plate 26 harbors four holes that have been either formed in a molding process or drilled (See also FIG. 2). These holes allow the rear axle mounting plate 26 to be attached to the rear mounting bracket 14 in an orientation wherein the end of the rear axle mounting plate 26 can be connected to the rear mounting bracket's 14 molded or drilled holes (See FIGS. 1-4). Attachment of the rear axle mounting plate 26 to the rear mounting bracket 14 can be accomplished by bolting, screwing, coupling, locking, mounting, securing, setting, or welding these two member using methods and materials well known in art (i.e. screws, or locking fasteners or clamps). As depicted in FIG. 2 as one embodiment, the rear mounting bracket 14 is attached to the rear mounting plate 26 using two drill holes. The rear axle mounting plate 26 provides the mounting attachment for connecting the rear mounting bracket 14 to the stabilizing axle 16 while partitioning and providing support for the tubular housing 18 to harbor the torsion assembly 20.

Figure 4:
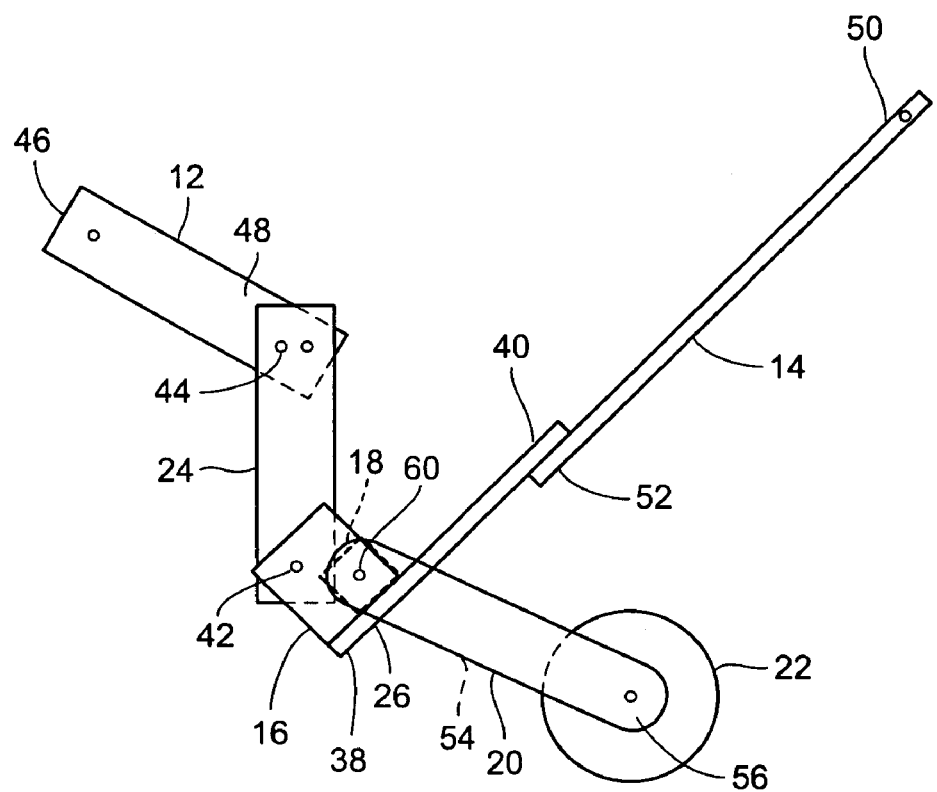
FIG. 4 is a sectional view of the arrangement of the stabilizing axle, the forward mounting bracket, the rear mounting bracket, the forward axle mounting plate, the rear axle mounting plate, the tubular housing, the torsion assembly, and the stabilizing wheel.

Further viewing FIGS. 1-4 and proximally moving along the stabilizing axle 16 toward the motorcycle frame 4, the attaching forward axle mounting plate 24 is welded to the tubular housing 18 and/or to stabilizing axle 16. The forward axle mounting plate 24 includes a first end 42 and a second end 44. As seen in FIGS. 3 and 4, the first end 42 may be welded or otherwise attached to the tubular housing member 18. The second end 44 harbors two holes that have been either formed in a molding process or drilled. These holes allow for the forward axle mounting plate 24 to be attached in a perpendicular orientation to the forward mounting bracket 12. Attachment of the forward axle mounting plate 24 to the forward mounting bracket 12 can be accomplished by bolting, screwing, coupling, locking, mounting, securing, setting, or welding these two members using methods and materials well known in art (i.e. screws, or locking fasteners or clamps). The forward axle mounting plate 24 provides the mounting attachment for connecting the forward mounting bracket 12 to the stabilizing axle 16 while providing further support for the tubular housing 18. This support allows the tubular housing 18 to remain parallel to the ground.

The attaching forward mounting bracket 12 includes a first end 46 and a second end 48 (See FIGS. 1-4). A counterpart forward mounting bracket 12 is symmetrically aligned on either end of the motorcycle frame 4. The first end 46 is attached proximal to the front portion 6 of the motorcycle frame 4 somewhere in the vicinity of the rear seat of the motorcycle. The first end 46 of the forward mounting bracket 12 harbors one hole that has been either formed in a molding process or drilled. This hole allows for detachment or attachment of the stabilizing device 10 to the motorcycle frame 4. Attachment of the first end 46 of the forward mounting bracket 12 can be accomplished by bolting, screwing, coupling, locking, mounting, securing, settling, or welding the forward mounting bracket 12 to the frame of the motorcycle 4. Preferably a locking mechanism located at the first end 46 can be used for easy detachment of the stabilizing device 10 from the motorcycle frame 4.

The second end 48 of the forward mounting bracket 12 is attached to the forward axle mounting plate 24 in a manner as discussed above. The forward mounting bracket 12 allows for attachment of the stabilizing device 10 to the motorcycle frame 4 and spatially aligns the stabilizing axle 16 in a perpendicular orientation to the motorcycle frame 4 by its connection to the forward axle mounting plate 24. The forward mounting bracket 12 is of a length such that the first end 46 may be attached to the motorcycle frame 4 and that the second end 48, which is attached to the stabilizing device 10, allows the stabilizing axle 16 to pass through the motorcycle frame 4 without binding with the motorcycle frame 4.

The rear mounting bracket 14 includes a first end 50 and a second end 52. A counterpart rear mounting bracket 14 is symmetrically aligned on either end of the motorcycle frame 4. The first end 50 is attached proximal to the rear portion 8 of the motorcycle frame 4 somewhere in the vicinity of the rear tire 36 of the motorcycle 2. The first end 50 harbors one hole that has been either formed in a molding process or drilled. This hole allows for detachment or attachment of the stabilizing device 10 to the motorcycle frame 4. Attachment of the first end 50 of the rear mounting bracket 14 can be accomplished by bolting, screwing, coupling, locking, mounting, securing, settling, or welding the rear mounting bracket 14 to the frame of the motorcycle 4. Preferably, a locking mechanism located at the first end 50 can be used for easy detachment of the stabilizing device 10 from the motorcycle frame 4.

The second end 52 of the rear mounting bracket 14 is attached to the rear axle mounting plate 26 in a manner as discussed above. The rear mounting bracket 14 allows for attachment of the stabilizing device 10 to the motorcycle frame 4 in conjunction with the attachment of the forward mounting bracket 12 and spatially aligns the stabilizing axle 16 in a perpendicular orientation to the motorcycle frame 4 by its connection to the rear axle mounting plate 26.

Referring to FIGS. 1, 2, and 4, the stabilizing device 10 further includes a torsion assembly 20 that is connected to a stabilizing wheel 22. The torsion assembly 20 includes a first end 54 and a second end 56. As shown in FIGS. 1 and 4, the first end of the torsion assembly 20 is mounted or affixed within the tubular housing 18 behind the rear axle mounting plate 26. The first end of the torsion assembly 20 has the same cross sectional shape as the tubular housing 18 to allow for a snug fitting or mounting between these two members. This snug fitting is due to the tubular housing 18 and the torsion assembly 20 having the same cross sectional shape. The cross sectional area of the torsion assembly 20 is slightly less than the cross sectional area of the tubular housing 18 to allow the first end 54 of the torsion assembly 20 to fit in the tubular housing 18. To illustrate, the cross sectional shape of the tubular housing 18 and the first end of the torsion assembly 20 can be a parallelogram or any other shape such as circular, triangular, or others known in the art that allow for a assemblage of these two members via placing the first end of the torsion assembly 20 within the tubular housing 18 and coupling these two members using methods well known in the art such as bolts, pins, etc.

Figure 5:
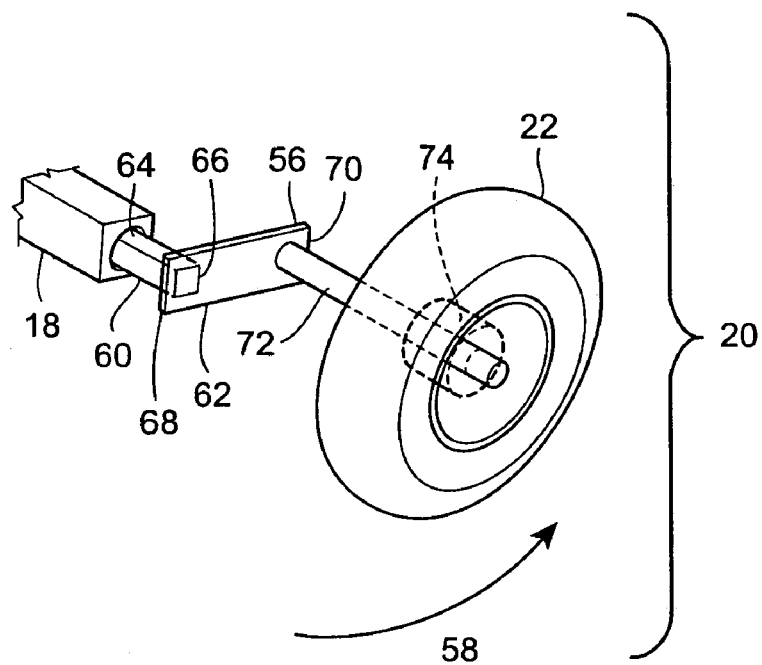
FIGS. 5 and 5A are sectional views of the torsion assembly constructed in accordance with the teachings of the disclosure.
Figure 5A:
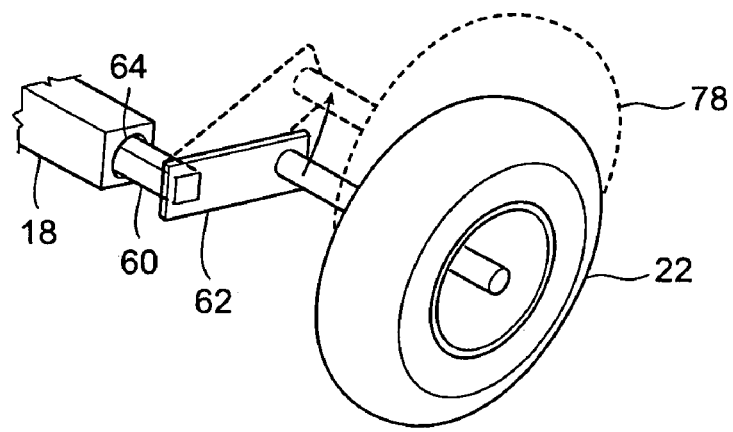

The second end of the torsion assembly 20 is mounted or affixed to a stabilizing wheel 22. The torsion assembly 20 provides the connection between the tubular housing 18 and the stabilizing wheel 22. The torsion assembly 20 further supports and allows the stabilizing wheel 22 to rotate around the second end of the torsion assembly 20. As shown in FIGS. 5 and 5A, when a force 58 is applied to the second end of the torsion assembly 56 (see FIG. 1), the first end of the torsion assembly 20 will rotate from a first position to a second position within the tubular housing 18. The tubular housing 18 provides an equal resilient force that stabilizes the torsion assembly 20. In addition, the stabilizing wheels 22 may slightly bend outward to provide further stability to the motorcycle 2. Each torsion assembly 20 and stabilizing wheel 22 is symmetrically aligned so each counterpart member is on either end of the motorcycle frame 4.

Referring to FIGS. 1 and 5, the torsion assembly 20 further comprises a torsion axle 60 and a connecting rod 62. Each member of the torsion assembly 20 is symmetrically orientated so that each member is on either end of the motorcycle frame 4. Counterpart members include, but are not limited to, the torsion axle 60, the connecting rod 62, and the first and second ends 54, 56 of the torsion assembly in general.

Referring to FIG. 5, the torsion axle 60 includes a first end 64 and a second end 66. The first end 64 of the torsion axle 60 is affixed or disposed within the tubular housing 18 and near the rear axle mounting plate 26. The second end 66 of the torsion axle 60 is affixed to the connecting rod 62. The connecting rod 62 includes a first end 68 and a second end 70. The first end 68 of the connecting rod 62 is fitted to the second end 66 of the torsion axle 60 in a matter well known in the art either by bolting, screwing, coupling, locking, securing, settling, or molding the torsion axle 60 to the connecting rod 62. Both the connecting rod 62 and the torsion axle 60 are made of materials well known in the art for such constructions such as aluminum, carbon, steel, or hard plastic. The second end 70 of the connecting rod 62 is further affixed to the stabilizing wheel 22 by methods well known in the art. The connecting rod 62 is attached to the stabilizing wheel 22 in a manner well known in the art such as attaching a spindle 72 to the connecting rod 62 and attaching the stabilizing wheel 22 to the spindle 72 through the use of a wheel bearing 74, for example. The components of the torsion assembly 20, specifically the torsion axle 60 and the connecting rod 62 connect the stabilizing wheel 22 and allow the stabilizing wheel 22 to freely rotate. In addition, it provides the torsional support force to keep the wheel perpendicular to the ground, but also withstand the gravitational force of the motorcycle 2 upon leaning through turns. The torsion axle 60 and connecting rod 62 are able to withstand the gravitational force to one side of the stabilizing device 10 because the torsion axle 60 (particularly the first end 64) is able to rotate from a first position to a second position upon application of a force 58 on that side of the stabilizing device 10. Upon suspension of the force, the torsion axle 60 rotates from the second position back to the original position. The torsion axle 60 is thus able to absorb the torsional force from the motorcycle 2 and the stabilizing wheel 22 is able to retract slightly up to maintain the motorcycle 2 upright in turns at either low or high speeds.

Figure 6:
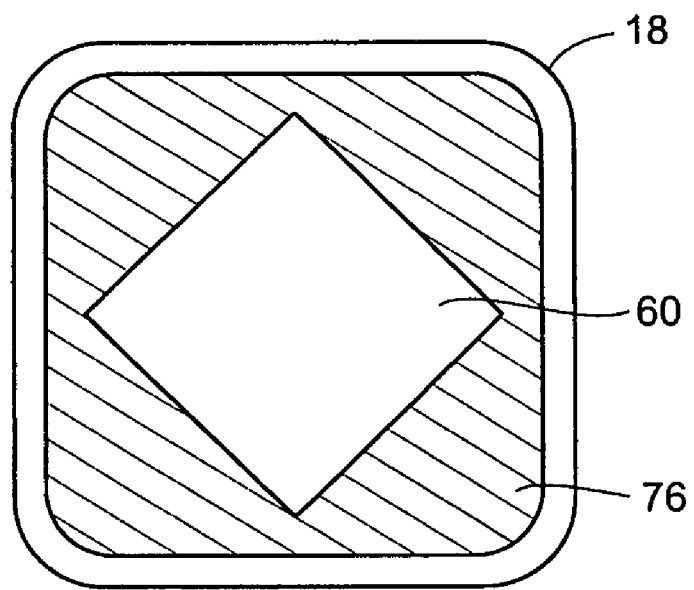
FIG. 6 is sectional view of the housing device constructed in accordance with the teachings of the disclosure.

Drawn in FIG. 6 is a sectional view of the tubular housing device 18 constructed in accordance with the teachings of the disclosure. The torsion axle 60 is affixed within the tubular housing 18 at a 90° angle to orientation of the tubular housing 18. As pictured, the tubular housing 18 appears as a square, while the torsion axle 60 appears as a diamond. The first end 64 of the torsion axle 60 is also the same as the shape as the tubular housing 18 with a small cross sectional area in order to fit within the tubular housing 18 and also be surrounded by the elastic receiver 76. The elastic receiver 76 is cut in a manner to receive the first end 64 of the torsion axle and provides a snug fitting of the torsion axle 60 within the tubular housing 18. As pictured in FIG. 6, the elastic receiver 76 is molded to create an opening that is the same cross sectional shape and area as the first end 64 of the torsion axle 60. FIGS. 5 and 6 demonstrate that the resilient force applied to the first end 64 of the torsion axle 60 is the result of an elastic receiver 76 secured within the tubular housing 18. The elastic receiver 76 absorbs the force 58 and provides stabilization to the stabilizing device 10. When the force 58 is applied to one side of the stabilizing device 10, the torsion axle 60 will rotate from a first position within the tubular housing 18 to a second position that is received by the elastic receiver 76. The elastic receiver 76 provides a resilient flexibility that absorbs the rotatational force provided by the torsion axle 60. After the force 58 subsides to the stabilizing device 10, the elastic receiver 76 provides a retracting force upon the torsion axle 60 that returns the torsion axle 60 from the second position back to the original first position. When the torsion axle 60 is received by the elastic receiver 76, the stabilizing wheel 22 may rotate slightly as well, but provide enough surface area so the stabilizing wheels 22 are in contact with the road for sufficient force to keep the motorcycle 2 upright at low or high speeds through a turn. The elastic receiver 76 can be made out of any materials known in the art such as rubber, hard plastic, hard rubberized material as long as it can absorb the rotational force of the torsion axle 60, and can provide an equal retracting force to rotate the torsion axle 60 to its original orientation within the tubular housing 18 upon removal of the force 58.

Figure 7:
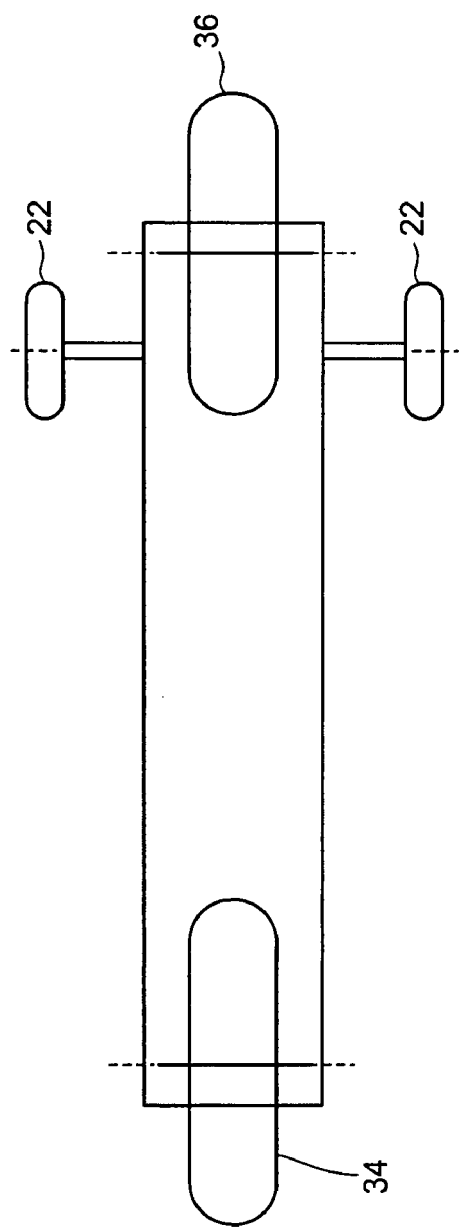
FIGS. 7 and 7A are views of the wheel placement of front and rear tires of the motorcycle in relation to the stabilizing wheels of the stabilizing device.
Figure 7A:
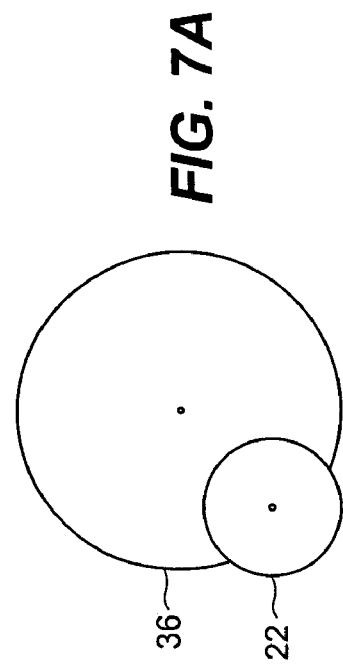

Referring to FIG. 7, wheel placement of the rear tire 36, front tire 34, and the stabilizing wheels 22 are aligned to provide maximum stability to the motorcycle 2. The stabilizing wheel 22 is aligned proximal to the rear wheel 36 of the motorcycle 2. The stabilizing wheel 22 can harbor any type of bearings and materials of bearings to withstand all speeds of the motorcycle. In addition, the material of the stabilizing wheel 22 can be composed of any mixture of rubber, wire and the sort that can be used in standard construction of motorcycle wheels to withstand high speeds and sharp turns for sufficient gripping to any type of surface, preferably concrete or blacktop. The stabilizing wheel 22 also provides the balance required for the stabilizing device 10 and allows the motorcycle 2 to move in the same upward, forward plane as the motorcycle wheels 2. Upon a force 58 being applied to the torsion axle 60 and elastic receiver 76 of the stabilizing device 10, the stabilizing wheel 22 will slightly rotate from a first position to a second position. This change in orientation of the stabilizing wheel 22 will still assist in keeping the motorcycle upright because enough of the surface area of the stabilizing wheel 22 is in contact with the road to provide sufficient force.

In accordance with the disclosed example, a number of features and variations may be contemplated. The following examples are illustrative only and in no way are intended to limit the scope of the invention to the exemplary details discussed. These illustrative examples include:

1. The materials used to manufacture the stabilizing device. These can be lightweight carbon or aluminum components or more heavy stronger materials such as steel.

2. The elastic receiver may be of different materials or shapes to allow for resiliency of the torsion axle and for the elastic receiver to allow some rotational movement of the torsion axle in order for the training wheels to sustain proper contact with the road without the motorcycle tipping over.

3. The shapes of the cross sectional fittings of the connecting rod, torsion axle, and the tubular housing can be of various shapes as long as the stabilizing wheels are able to adjust from a first position to a second position upon an imposition of some force.

4. The method of attaching the stabilizing device can vary as far as what components are permanently part of the motorcycle and what components can be detached and stored. Locking mechanism or clip in bolts would be an easy way for one to detach or attach the various components of the stabilizing device to the motorcycle.

5. The applicability of using the stabilizing device with other cyclic motorized or non-motorized modes of transportation can be applied to, but is not limited to devices such as bicycles, scooters, mopeds, and unicycles.

From the foregoing, one of ordinary skill in the art will appreciate that the present disclosure sets forth a stabilizing device for a motorcycle. However, one of ordinary skill in the art could readily apply the novel teachings of this disclosure to any number of situations in which this device could be used. As such, the teachings of this disclosure shall not be considered to be limited to the specific examples disclosed herein, but to include all applications within the spirit and scope of the invention.

We claim:

1. A stabilizing device for attachment to a motorcycle frame, the stabilizing device comprising:
    a housing having an elastic receiver disposed within the housing;
    a stabilizing axle for coupling the housing to the motorcycle frame, wherein the stabilizing axle passes through the motorcycle frame;
    a torsion assembly having a first and second end, the first end being disposed within the housing, the torsion assembly including a torsion axle and a connecting rod, each with a first and second end, the first end of the torsion axle being disposed within the elastic receiver and the second end connected to the first end of the connecting rod, an inner surface of the elastic receiver and the first end of the torsion axle having the same cross-sectional shape, wherein the elastic receiver provides resiliency to the torsion assembly for assisting in keeping a motorcycle upright and allowing the motorcycle to lean through turns;
    a pair of mounting brackets coupled to the motorcycle frame allowing the stabilizing axle to pass through the motorcycle frame without binding the stabilizing axle with the motorcycle frame;
    a stabilizing wheel mounted to the second end of the torsion assembly, the stabilizing wheel forming an angle with a ground plane; and
    wherein a force applied to the second end of the torsion assembly causes the torsion assembly to rotate from a first position to a second position without substantially changing the angle formed by the stabilizing wheel and the ground plane.

2. The stabilizing device of claim 1, wherein the housing has a tubular shape.

3. The stabilizing device of claim 1, wherein the elastic receiver provides the torsion assembly resiliency in providing assistance in keeping the motorcycle upright and allowing the motorcycle to lean through turns at low speeds.

4. The stabilizing device of claim 1, wherein the elastic receiver in the torsion axle provides assistance in keeping the motorcycle upright and allowing the motorcycle to lean through turns at high speeds.

5. The stabilizing device of claim 1, further comprising a rear mounting bracket and a front mounting bracket, both attached to the stabilizing axle and to the motorcycle frame.

6. The stabilizing device of claim 1, wherein the rotation of the torsion assembly is resilient.

7. A stabilizing device for attachment to a motorcycle frame, the device comprising:
    a pair of front mounting brackets for attachment to opposite sides of the motorcycle frame;
    a pair of rear mounting brackets for attachment to the opposite sides of the motorcycle frame;
    a pair of rear axle mounting plates attached to one end of the rear mounting brackets;
    a pair of front axle mounting plates attached to one of the front mounting brackets;
    a stabilizing axle attached to each front axle mounting plate and each rear axle mounting plate;
    a tubular housing attached to the stabilizing axle;
    an elastic receiver disposed within the housing;
    a torsion assembly including a torsion axle and connecting rod, each with a first and second end, the first end of the torsion axle being disposed within the tubular housing and the second end connected to the first end of the connecting rod, an inner surface of the elastic receiver and the first end of the torsion axle having the same cross-sectional shape;
    a stabilizing wheel mounted to the second end of the connecting rod, the stabilizing wheel forming an angle with a ground plane;
    wherein a force applied to the stabilizing wheel causes the torsion axle to rotate from a first position to a second position without substantially changing the angle formed by the stabilizing wheel and the ground plane, and wherein upon removal of the force, the torsion axle is adapted to rotate from the second position to the first position without substantially changing the angle formed by the stabilizing wheel and the ground plane.

8. The stabilizing device of claim 7, wherein the frame of the motorcycle is supported by the torsion assembly.

9. The stabilizing device of claim 7, wherein the elastic receiver includes an inner surface adapted to engage an outer surface of the first end of the torsion axle.

10. The stabilizing device of claim 7, wherein the first end of the torsion axle has a cross section shape of a parallelogram.

11. The stabilizing device of claim 7, wherein the stabilizing wheel can move in a vertical and horizontal direction.

12. The stabilizing device of claim 7, wherein the rotation of the torsion axle is resilient.

* * * * *